United States Patent
Zelhofer et al.

(10) Patent No.: US 9,088,342 B2
(45) Date of Patent: Jul. 21, 2015

(54) METHOD AND APPARATUS FOR INPUT CABLE LENGTH INDICATION FOR SDI SIGNALS

(75) Inventors: Walter Zelhofer, Grass Valley, CA (US); Matthew Alan Woolsey, Grass Valley, CA (US)

(73) Assignee: GVBB Holdings S.A.R.L., Luxembourg (LU)

(*) Notice: Subject to any disclaimer, the term of this patent is extended or adjusted under 35 U.S.C. 154(b) by 516 days.

(21) Appl. No.: 13/318,346

(22) PCT Filed: Apr. 30, 2009

(86) PCT No.: PCT/US2009/002657
§ 371 (c)(1),
(2), (4) Date: Feb. 27, 2012

(87) PCT Pub. No.: WO2010/126467
PCT Pub. Date: Nov. 4, 2010

(65) Prior Publication Data
US 2012/0146618 A1    Jun. 14, 2012

(51) Int. Cl.
*G01N 27/00* (2006.01)
*H04B 3/46* (2015.01)
*H04L 25/03* (2006.01)

(52) U.S. Cl.
CPC ............ *H04B 3/46* (2013.01); *H04L 25/03885* (2013.01)

(58) Field of Classification Search
CPC ............................ H04B 3/46; H04L 25/03885

USPC ........... 324/71.1, 76.11, 76.41, 76.69, 93, 95, 324/138, 539, 543, 84, 500
See application file for complete search history.

(56) References Cited

U.S. PATENT DOCUMENTS

| | | | | |
|---|---|---|---|---|
| 5,339,022 | A | * | 8/1994 | Fleming et al. .................. 324/67 |
| 5,818,378 | A | * | 10/1998 | Cheng et al. .................. 341/155 |
| 2005/0169436 | A1 | * | 8/2005 | Balkman ......................... 379/24 |

OTHER PUBLICATIONS

"LMH0344 3 Gbps HD/SD SDI Adaptive Cable Equalizer" National Semiconductor Corporation, Feb. 19, 2008, Retrieved from the Internet: URL:http://www.ic-on-line.cn/IOL/datasheet/lmh034408_4358903.pdf, pp. 1-8, XP002568019.
International Search Report for International Application No. PCT/US2009/002657, mailed Feb. 24, 2010, 1 pages.
International Preliminary Report on Patentability dated Nov. 1, 2011 and Written Opinion dated Feb. 24, 2010 regarding PCT/US2009/002657.

* cited by examiner

*Primary Examiner* — Melissa Koval
*Assistant Examiner* — Trung Nguyen
(74) *Attorney, Agent, or Firm* — Arent Fox LLP

(57) ABSTRACT

A technique for indicating an input cable length includes measuring within a cable equalizer circuit a differential voltage that varies approximately linearly in proportion to cable length. The measured voltage is translated into a cable length measurement corresponding to the connected input cable. The translated input cable length measurements can be provided on a graphical user interface (GUI) in the form of a graphical representation and/or numerical value.

21 Claims, 5 Drawing Sheets

METHOD AND APPARATUS FOR INPUT CABLE LENGTH INDICATION FOR SDI SIGNALS

CROSS-REFERENCE TO RELATED APPLICATION

This application is a United States National Stage Application under 35 U.S.C. §371 of International Patent Application No. PCT/US2009/002657, filed Apr. 30, 2009, the contents of which is incorporated by reference into this application as is fully set forth herein.

BACKGROUND

1. Technical Field

The present invention relates to serial digital interface (SDI) signals. More particularly, this invention it relates to a method and apparatus for indicating the input cable length for SDI signals.

2. Description of Related Art

The length of a cable plays a critical role in the transmission of signals carried thereby. The length of input cable can affect the signals being transmitted both in terms signal degradation and/or a burst of Cyclic Redundancy Check (CRC) errors. For cables that carry Serial Digital Interface (SDI) signals, the cable length becomes especially important because of the so-called cliff effect, which occurs when the cable losses associated with the SDI signal prevent the ability to receive the signals accurately. Thus, knowledge of the cable length becomes important to make sure the cable conforms to a minimum operating threshold.

One technique for measuring the length of a cable link in a computer network involves sending test signals through a cable and examining the characteristics of the received signal. (See for example, U.S. Pat. No. 6,614,236). For purposes of fiber optic cables, the length determination enables a determination of a tolerable propagation delay between a repeater and a base station (See for example, U.S. Publication No. 2004/0233874).

A need exists for a simple reliable technique for determining the length of a cable to carry SDI signals.

SUMMARY OF THE INVENTION

The present invention provides a method and apparatus for indicating cable length on an SD-SDI, HD-SDI or up to 3 Gbps serial input signals. The method for indicating an input cable length includes measuring a differential voltage that varies approximately linearly in proportion to cable length translating the measured voltages into a cable length measurement corresponding to the connected input cable.

The measuring includes measuring a differential ACC voltage on input equalizers coupled to the at least one input port of the circuit. More specifically, the measuring further includes measuring differential voltage changes in a range of −1V to +1V resulting from the connection of the input cable to be measured to the at least one input port. The translating includes translating the differential ACC voltage measurements into the cable length measurement. The translating further includes performing a linear approximation of the cable length based on measured minimum and maximum data pairs of ACC voltage measured on the input cable According to another implementation of the invention, an apparatus for indicating an input cable length includes a cable length circuit having at least one input for receiving a cable whose length is to be measured, The circuit also includes means for measuring differential voltages in the circuit as a result of the cable connection to the at least one input port. Further, the circuit includes means for translating the measured differential voltages into a cable length representation, and means for graphically displaying the cable length representation.

The measuring means includes input equalizers contained within said cable length circuit and integrated circuits (ICs) configured to measure ACC differential voltages resulting from the connection of a cable to be measured. The translating means includes circuitry for linearly interpolating the measured differential voltages.

The graphical display means includes a display screen having a graphical user interface and an indicator for showing the determined cable length both graphically and numerically on the display screen.

Other aspects and features of the present principles will become apparent from the following detailed description considered in conjunction with the accompanying drawings. However, that the drawings exist for purpose of illustration and not as a definition of the limits of the present principles, for which reference should be made to the appended claims. The drawings do not necessarily appear to scale and that, unless otherwise indicated, they merely conceptually illustrate the structures and procedures described herein.

BRIEF DESCRIPTION OF THE DRAWINGS

In the drawings wherein like reference numerals denote similar components throughout the views.

DETAILED DESCRIPTION

Figure 1A:
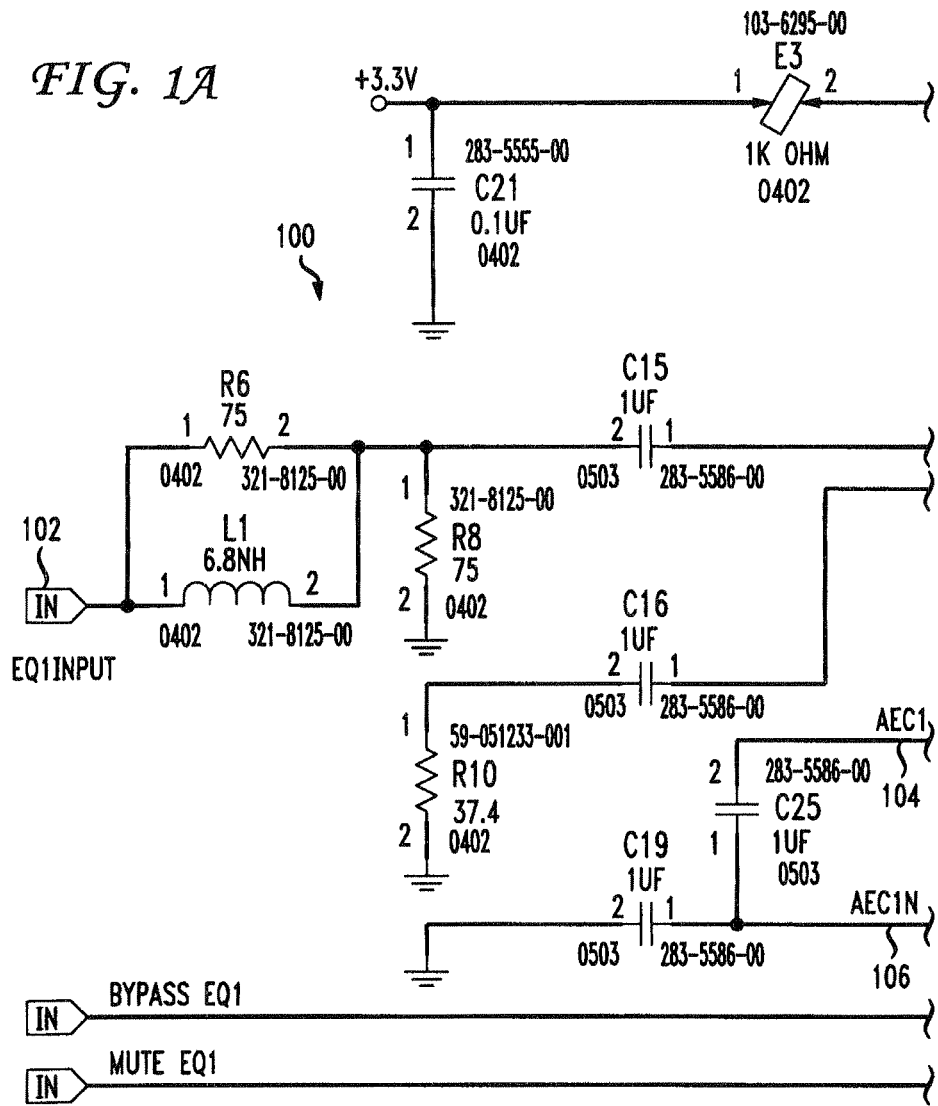
FIG. 1 is a schematic diagram of an exemplary circuit used for measuring the input cable length for SDI signals according to an implementation of the present invention.
Figure 1:
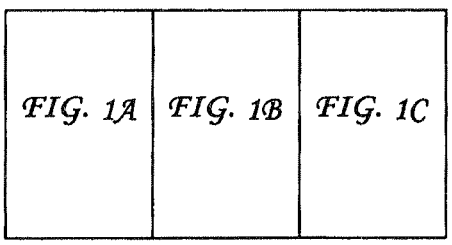
Figure 1B:
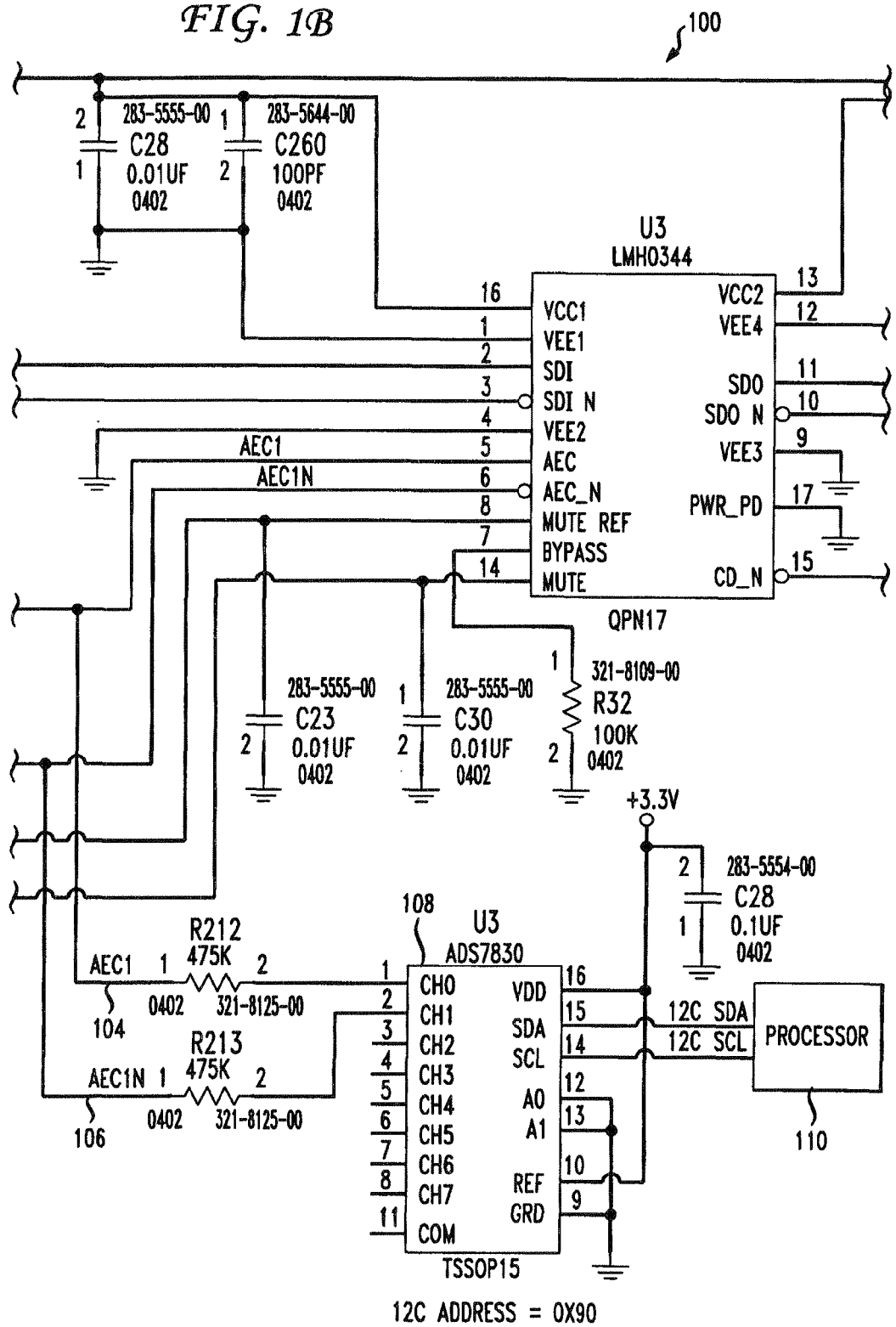
Figure 1C:
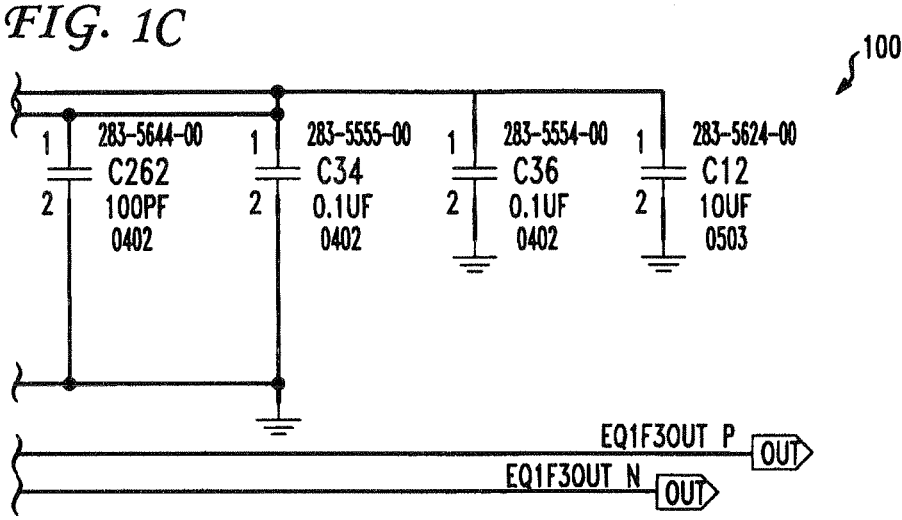
Figure 1C:
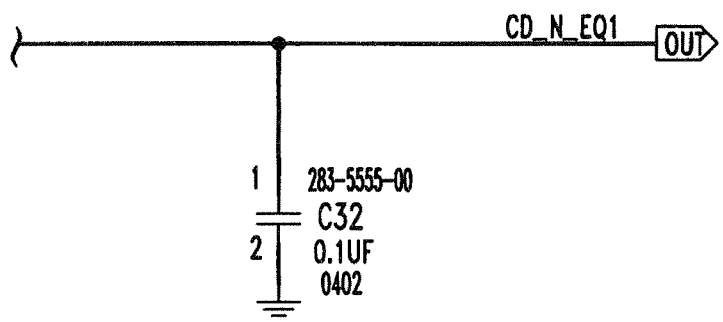

FIG. 1 shows a schematic diagram of an exemplary circuit 100 for equalizing cable loss that includes the ability to measure cable length in accordance with the present principles. The circuit measures the cable length with a better than 80% precision estimate of cable length without calibration. By calibrating between minimum and maximum cable length of 0 m to 100 m, the precision can increase to as much as 95%.

Circuit 100 comprises an adaptive cable equalizer 101, which in the exemplary embodiment, comprises a model LMH0344 adaptive cable equalizer integrated circuit available from National Semiconductor Corporation. Integrated circuits with similar functionality are available from other suppliers. The equalizer 101 has an input port 102, which receives the SD-SDI or HD-SDI signals from a cable (not shown). Upon receipt of the input signal at the input port 102, the equalizer 101 will generate a voltage, hereinafter referred to as the ACC voltage, between lines 104 and 106 of the equalizer (e.g., pins 5 and 6 of the integrated circuit comprising the equalizer). The ACC voltage between lines 104 and 106 constitutes a differential voltage that changes inside the range of −1V to +1V. The ACC voltage between lines 104 and 106 varies linearly in a manner proportional to the length of the cable connected at the input port 102.

The measured ACC voltage is translated into a length estimation by performing a linear approximation based on measured minimum and maximum data pairs of lengths to ACC voltages at a minimum and maximum cable length (e.g., 0 m-100 m) and then calculating any pairs between. Thus, for example, the mean of the two extreme voltages (for 0 m and 100 m, respectively) would yield an estimate of a 50 m cable. Pairs of intermediate values undergo linear interpolation to yield a cable length estimate.

In accordance with the present principles, the circuit 100 includes an analog-to-digital converter (A/D) 108, typically in the form of a model ADS 7830 A/D converter available from Texas Instruments. The A/D converter 108 converts the ACC voltage between lines 104 and 106 to a digital value for input to a processor 110, which can interpolate the value to estimate the cable length and provide output signal indicative of that information for graphical display.

Figure 2:
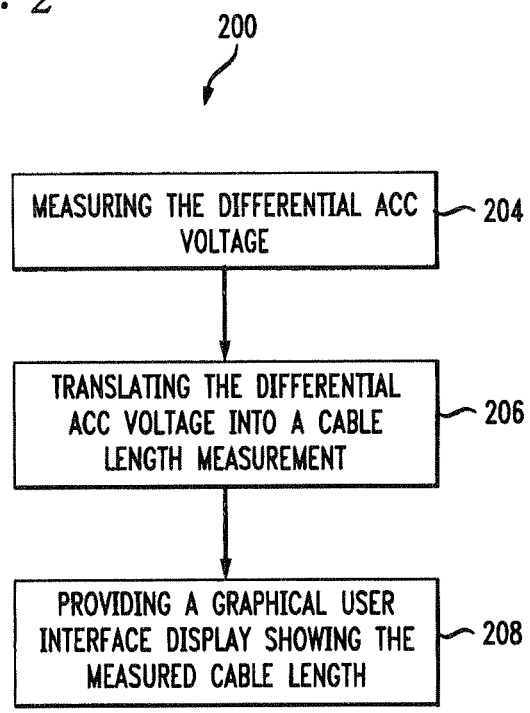
FIG. 2 is flow diagram of the method for indicating the input cable length for SDI signals according to an implementation of the present invention.

FIG. 2 depicts in flow chart form the steps of a method 200 executed by the circuit 100 of FIG. 1 for estimating the length of a cable carrying input SDI signals according to an implementation of the present invention. The process 200 commences by measuring the differential ACC voltage between lines 104 and 106 of FIG. 1 during step 204 of FIG. 2. As discussed, the measured differential ACC voltage values vary linearly in proportion with the input cable length as between a minimum and maximum. Those of skill in the art will recognize that the minimum and maximum ranges depend on the characteristics of the equalizer 101 and A/D converter 108 of FIG. 1. Thereafter during step 206 of FIG. 2, the combination of the A/D converter 108 and processor 110 of FIG. 1 translate the differential ACC voltage into a cable length estimate for graphical display during step 208 of FIG. 2

Figure 3:
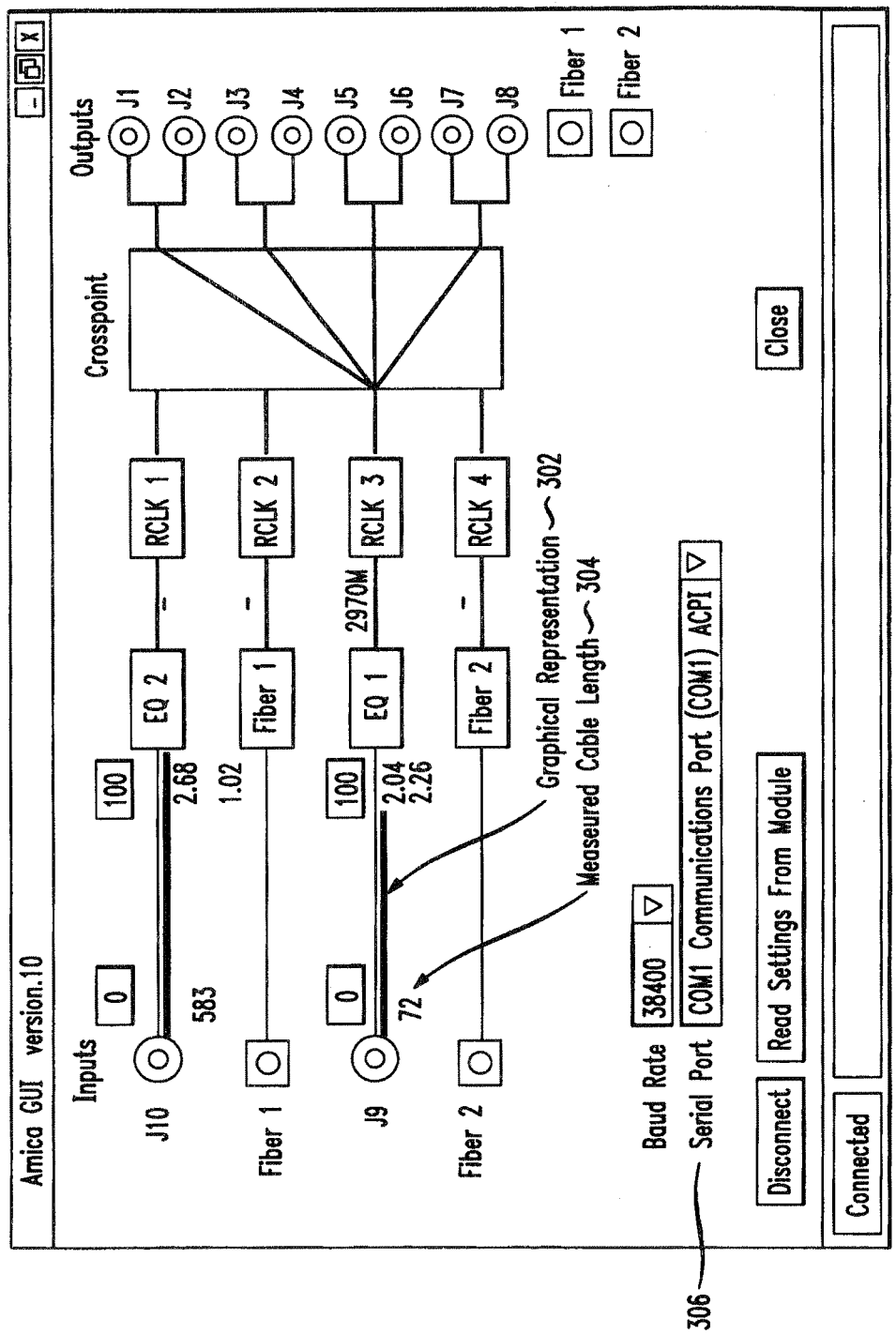
FIG. 3 is a representation of a graphical user interface (GUI) showing the indication of input cable length for SDI signals, according to an implementation of the present invention.

FIG. 3 shows an exemplary graphical user interface (GUI) 300 according to an implementation of the present invention for providing a display of the cable length measurement. GUI 300 operates in conjunction with the circuit 100 to provide a graphical representation 302 of the input cable length 304. In this example, the graphical representation 302 shows a bar which is proportional to the cable length without calibration. The circuit 100 of FIG. 1 generates this information to provide the graphical representation 300. The precision of the measurements and cable length estimations can be increased to 95% by calibrating between minimum and maximum cable length that is 0 m and 100 min the case of the example shown in FIG. 3. The measured cable length 304 is also provided in a numerical representation.

The foregoing describes a technique for estimating the length of a cable carrying SDI signals.

Features and aspects of described implementations may be applied to various applications. Applications include, for example, individuals using host devices in their homes to communicate with the Internet using an Ethernet-over-cable communication framework, as described above. However, the features and aspects herein described may be adapted for other application areas and, accordingly, other applications are possible and envisioned. For example, users may be located outside of their homes, such as, for example, in public spaces or at their jobs. Additionally, protocols and communication media other than Ethernet and cable may be used. For example, data may be sent and received over (and using protocols associated with) fiber optic cables, universal serial bus (USB) cables, small computer system interface (SCSI) cables, telephone lines, digital subscriber line/loop (DSL) lines, satellite connections, line-of-sight connections, and cellular connections.

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data transmission and reception. Examples of equipment include video coders, video decoders, video codecs, web servers, set-top boxes, laptops, personal computers, and other communication devices. As should be clear, the equipment may be mobile and even installed in a mobile vehicle.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. As should be clear, a processor may include a processor-readable medium having, for example, instructions for carrying out a process.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream, packetizing the encoded stream, and modulating a carrier with the packetized stream. The information that the signal carries may be, for example, analog or digital information. The signal may be transmitted over a variety of different wired or wireless links, as is known.

Those skilled in the art will appreciate that the above-described exemplary embodiment could give rise to various possible modifications. Additionally, one of ordinary skill will appreciate the ability to substitute other structures and processes for those disclosed and the resulting implementations will perform at least substantially the same function(s), in at least substantially the same way(s), to achieve at least substantially the same result(s) as the implementations disclosed. Accordingly, these and other implementations lie within the scope of the following claims.

The invention claimed is:

1. A method for indicating an input cable length comprising:
    measuring a voltage differential on input equalizers, wherein the voltage differential varies between first and second values approximately linearly in proportion to the input cable length;

translating the measured differential voltage into a cable length measurement;

performing a calibration using a first measurement for a minimum length cable and a second measurement for a maximum length cable prior to translating the measured differential voltage into a cable length measurement, wherein the measured differential voltage is translated into a cable length measurement by performing a linear approximation based on the first measurement and the second measurement; and displaying a representation of the measured cable length.

2. The method according to claim 1, wherein said translating comprises interpolating between a minimum and maximum voltage values corresponding to a minimum and maximum cable lengths.

3. The method according to claim 1, wherein the first and second values correspond to −1 Volt and +1 Volt, respectively.

4. The method of claim 1, further comprising displaying a numerical representation of the measured cable length.

5. The method of claim 1, wherein the input equalizers are operably coupled to at least one input port of an adaptive cable equalizer circuit, wherein the measuring includes measuring a differential voltage change resulting from a connection of the input cable to the at least one input port.

6. The method of claim 5, wherein when the input port receives a signal from the input cable, the adaptive cable equalizer circuit generates a voltage.

7. The method of claim 1, wherein the voltage differential comprises an ACC voltage differential.

8. The method of claim 1, wherein the input cable comprises a serial digital interface (SDI) cable.

9. The method of claim 1, further comprising:
calibrating between a minimum and maximum cable length prior to performing the measurement.

10. The method of claim 1, further comprising:
converting the voltage differential to a digital value that interpolated to estimate the input cable length.

11. The method of claim 1, wherein the voltage differential is measured for a serial digital interface (SDI) signal.

12. The method of claim 1, wherein the voltage differential is measured between two lines of the equalizer.

13. The method of claim 12, wherein the voltage differential is measured between two pins of an integrated circuit comprising the equalizer.

14. The method of claim 1, wherein displaying a representation of the measured cable length comprises:

displaying a graphical user interface showing both a graphical illustration and numerical representation of the measured cable length.

15. An apparatus for indicating an input cable length comprising:

means for measuring a voltage differential on input equalizers, wherein the voltage differential varies between first and second values approximately linearly in proportion to the input cable length;

means translating the measured differential voltage into a cable length measurement;

means for performing a calibration using a first measurement for a minimum length cable and a second measurement for a maximum length cable prior to translating the measured differential voltage into a cable length measurement, wherein the measured differential voltage is translated into a cable length measurement by performing a linear approximation based on the first measurement and the second measurement; and means for displaying a representation of the measured cable length.

16. The apparatus according to claim 15, wherein the measuring means includes an analog-to-digital converter configured to convert the voltage differential to a digital value that interpolated to estimate the input cable length.

17. The apparatus according to claim 15, wherein said means for graphically displaying comprises a display screen having a graphical user interface and an indicator for showing the determined cable length both graphically and numerically on the display screen.

18. The apparatus of claim 15, further comprising:
means for displaying a numerical representation of the measured cable length.

19. The apparatus of claim 15, wherein the means for measuring a differential comprise input equalizers operably coupled to at least one input port of an adaptive cable equalizer circuit, wherein the measuring includes measuring a differential voltage change resulting from a connection of the input cable to the at least one input port.

20. The apparatus of claim 19, wherein when the input port receives a signal from the input cable, the adaptive cable equalizer circuit generates a voltage.

21. The apparatus of claim 15, wherein the voltage differential comprises an ACC voltage differential.

* * * * *